US011295547B2

(12) United States Patent
Biswas (10) Patent No.: US 11,295,547 B2
(45) Date of Patent: Apr. 5, 2022

(54) SYSTEM AND METHOD FOR DETECTING INTERACTION WITH LIVING OBJECT

(71) Applicant: Board of Trustees of Michigan State University, East Lansing, MI (US)

(72) Inventor: Subir K. Biswas, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 667 days.

(21) Appl. No.: 15/486,994

(22) Filed: Apr. 13, 2017

(65) Prior Publication Data

US 2017/0323155 A1 Nov. 9, 2017

Related U.S. Application Data

(60) Provisional application No. 62/333,431, filed on May 9, 2016.

(51) Int. Cl.
*G06V 40/10* (2022.01)
*G01S 15/08* (2006.01)
*G01S 15/52* (2006.01)
*G06V 40/40* (2022.01)

(52) U.S. Cl.
CPC ............. *G06V 40/10* (2022.01); *G01S 15/08* (2013.01); *G01S 15/523* (2013.01); *G06V 40/45* (2022.01); *G06V 40/15* (2022.01)

(58) Field of Classification Search
CPC ........ G06K 9/00; G06K 9/62; G06K 9/00362; G06K 9/00906; G01S 15/08; G01S 15/52; G01S 15/523
See application file for complete search history.

(56) References Cited

U.S. PATENT DOCUMENTS

| 8,554,615 | B2 | 10/2013 | Biswas | |
|---|---|---|---|---|
| 2004/0160324 | A1* | 8/2004 | Stilp | G08B 25/008 340/572.1 |
| 2009/0164549 | A1* | 6/2009 | Jung | G06Q 30/02 709/201 |

(Continued)

OTHER PUBLICATIONS

Doyle, Jeremy, "Big Data Can Drive Big Results," Sociometricsolutions. com; Jun. 16, 2015.

(Continued)

*Primary Examiner* — Isam A Alsomiri
*Assistant Examiner* — Amie M Ndure
(74) *Attorney, Agent, or Firm* — Harness Dickey & Pierce PLC (57) ABSTRACT

A living object detection system may detect the interaction between an observer and a target object. The system may include an object sensor device, an object classification data unit, and an object detection module. The object sensor device may be attachable to the observer and include an ultrasonic sensor for sensing distance and a passive infrared sensor for sensing temperature. The object classification data unit may store predetermined object classifiers that identifies an object as a living object or non-living object. The object detection module may determine the target object as a living object or a non-living object based on the object classifiers stored in the object classification data unit and on a physical feature set of the target object, where the physical feature set may include distance and temperature parameters.

18 Claims, 7 Drawing Sheets

(56) References Cited

U.S. PATENT DOCUMENTS

| | | | |
|---|---|---|---|
| 2010/0177968 A1* | 7/2010 | Fry | A61B 5/0452 382/224 |
| 2010/0296703 A1* | 11/2010 | Marti | G06K 9/00805 382/103 |
| 2011/0257496 A1* | 10/2011 | Terashima | G06F 19/00 600/347 |
| 2012/0188844 A1* | 7/2012 | Tiltman | B29C 39/003 367/2 |
| 2013/0077442 A1* | 3/2013 | Hersey | G01S 15/526 367/99 |
| 2014/0163343 A1* | 6/2014 | Heneghan | A61B 5/0507 600/324 |
| 2014/0217967 A1* | 8/2014 | Zeine | H02J 7/025 320/108 |
| 2015/0080672 A1 | 3/2015 | Biswas et al. | |
| 2016/0003615 A1 | 1/2016 | Biswas et al. | |
| 2017/0077736 A1* | 3/2017 | Leabman | H02J 7/025 |
| 2017/0126332 A1 | 5/2017 | Biswas et al. | |
| 2020/0006988 A1* | 1/2020 | Leabman | A61B 8/56 |
| 2020/0021128 A1* | 1/2020 | Bell | G06K 9/52 |

OTHER PUBLICATIONS

Khazan, Olga; "Thinking Outside the Cube," The Atlantic; Sep. 2015.

Bosanac, Alexandra, "How 'people analytics' is transforming human resources," http://www.canadianbusiness.com; May 11, 2017.

Waber, Benjamin, N. et al., "Sensing Informal Networks in Organizations," American Behavioral Scientist; Nov. 21, 2014.

Wu, Lynn et al., "Mining Face-to-Face Interaction Networks Using Sociometric Badges: Predicting Productivity in an IT Configuration Task," In Proceedings of the International Conference on Information Systems; Paris, France; Dec. 14-17, 2008.

Olguin, Daniel et al., "Capturing Individual and Group Behavior with Wearable Sensors," AAAI Spring Symposium on Human Behavior Modeling; Stanford, CA; Mar. 2009.

* cited by examiner

SYSTEM AND METHOD FOR DETECTING INTERACTION WITH LIVING OBJECT

CROSS-REFERENCE TO RELATED APPLICATIONS

This application claims priority to U.S. Provisional Patent Application No. 62/333,431, filed on May 9, 2016, which is incorporated by reference herein.

FIELD

The present disclosure relates to detecting interaction of an object with a living object and, more particularly, to detecting human interaction.

BACKGROUND

Characterizing the nature of human interaction can offer tremendous value in a variety of applications throughout the social and life sciences. While the attributes of such exchanges, such as interaction proximity and duration, have traditionally been recorded using either direct observation or surveys, recent technological advances have improved both the objectivity and granularity of the associated information which may be obtained. Many existing solutions for sensing interaction attributes have been proposed using the native hardware found in smartphones, including Bluetooth and WiFi modules, microphone, and camera. More recently, the scaling of such approaches to smaller form-factors, including smart watches and fitness trackers, has also been demonstrated.

While advantageous with respect to their ubiquity, the above techniques are inherently restricted from addressing scenarios in which the end-user seeks to extract high-fidelity information regarding interaction geometry using a stand-alone platform which is privacy-considerate. For example, consider applications in mental health management, such as tracking the personal interactions of depression sufferers for purposes of triggering early intervention therapies. Systems which rely upon peer-to-peer communication mechanisms, such as those aforementioned approaches using Bluetooth scanning or WiFi RSSI, are unable to distinguish mere proximity from true interaction with high levels of reliability. The efficacy of such techniques is further diminished by the requirement that both individuals be in possession of dedicated hardware platforms, such as a smartphone or smartwatch. While these concerns are alleviated for architectures which quantify interaction based upon the processing of audio or video information captured by a stand-alone device, the privacy concerns associated with these modalities provide alternative objections to their feasibility.

This section provides background information related to the present disclosure which is not necessarily prior art.

SUMMARY

This section provides a general summary of the disclosure, and is not a comprehensive disclosure of its full scope or all of its features.

The present disclosure is generally directed toward a living object detection system for detecting the interaction between an observer and a target object. The living object detection system may include an object sensor device, an object classification data unit, and an object detection module.

The object sensor device may be attachable to the observer and includes an ultrasonic sensor for sensing distance and a passive infrared sensor for sensing temperature. The object sensor device may output sensor information that includes data indicative of the distance sensed by the ultrasonic sensor and of the temperature sensed by the passive infrared sensor. The object classification data unit may store predetermined object classifiers that identifies an object as a living object or non-living object.

The object detection module may be in communication with the object sensor device, and receives the sensor information from the object sensor device. The object detection module may determine the target object as a living object or a non-living object based on the object classifiers stored in the object classification data unit and on a physical feature set of the target object. The physical feature set may include a distance parameter and a temperature parameter of the target object, which may be determined using the sensor information.

In another aspect, the present disclosure is generally directed toward a method for detecting an interaction between an observer and a target object. The method may include sensing, by an object sensor device, a distance to the target object and a temperature of the target object. The object sensor device may be attachable to the observer and include an ultrasonic sensor for sensing distance and a passive infrared sensor for sensing temperature. The method further calculates a physical feature set of the target object based on the distance and the temperature sensed by the object sensor device and on predefined algorithms. The physical feature set may include a distance parameter and a temperature parameter. The target object may be classified as a living object or a non-living object based on the physical feature set and predetermined object classifiers, where the predetermined object classifiers associates predetermined physical feature values for classifying a given object as a living object and for classifying a given object as a non-living object.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

A living object detection system of the present disclosure detects the interaction between an observer and a living object, such as a human or other warm-blooded animal. The system includes a sensor device attached to an observer that detects a distance and a temperature of a target object located within a detection region of the sensor device. Using the distance data and the temperature data, the system determines physical features of the target object and then classifies the target object as, for example, either living or non-living based on predefined object classifiers. The living object detection system of the present disclosure is an asymmetric interaction detection system that effectively detects the interaction between two living objects without requiring, for example, audio and/or video data of the interaction and/or requiring that both objects have an electronic device that exchange data.

In an example embodiment, the living object detection system may be configured to determine whether a subject person, as an observer, interacts with another human or other living animal, and may further monitor certain interaction parameters, such as the distance between the subject person and the living animal. Alternatively, the living object detection system may also be configured to determine whether an inanimate object, as an observer, is in proximity of a living animal. For example, the system may be implemented to determine if a vehicle is in proximity of a living animal, such as a human or a deer. In the following description, the living object detection system is described to monitor the interaction between an observer having the sensor device and a target object.

Figure 1:
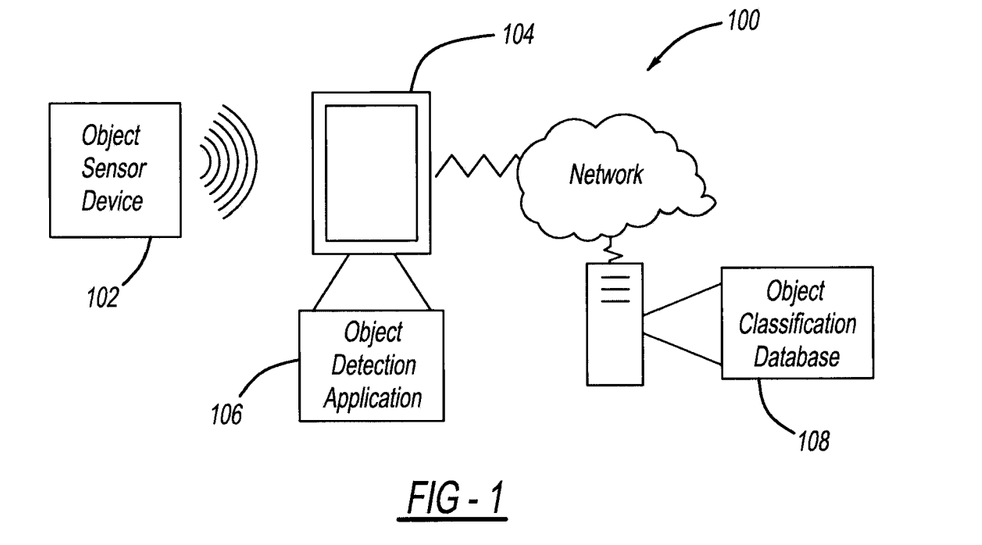
FIG. 1 illustrates a living object detection system of the present disclosure.

The present disclosure will now be described more fully with reference to accompanying drawings. FIG. 1 illustrates an example of a living object detection system 100 of the present disclosure. The living object detection system 100 includes an object sensor device 102, a computing device 104 that includes an object detection application 106, and an object classification database 108. The object sensor device 102 is attachable to the observer and detects a distance to the target object and a temperature of the target object. The object sensor device 102 may transmit the distance and temperature to the object detection application 106, which resides in the computing device 104. The object detection application 106 may analyze the data using information in the object classification database 108 to determine whether the observer is interacting with a living object or a non-living object.

Figure 2:
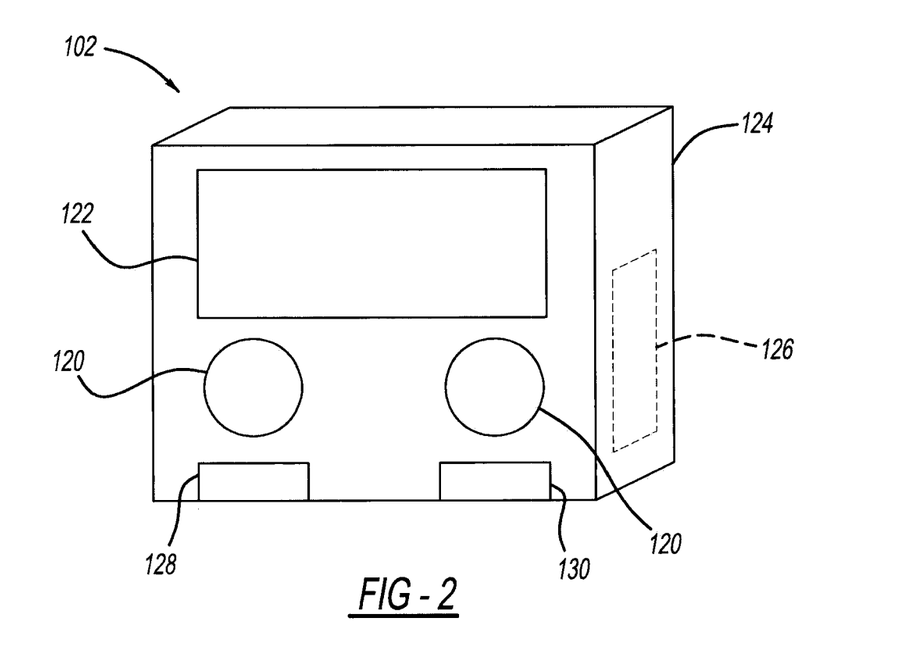
FIG. 2 is a schematic of an object sensor device of the living object detection system.
Figure 3:
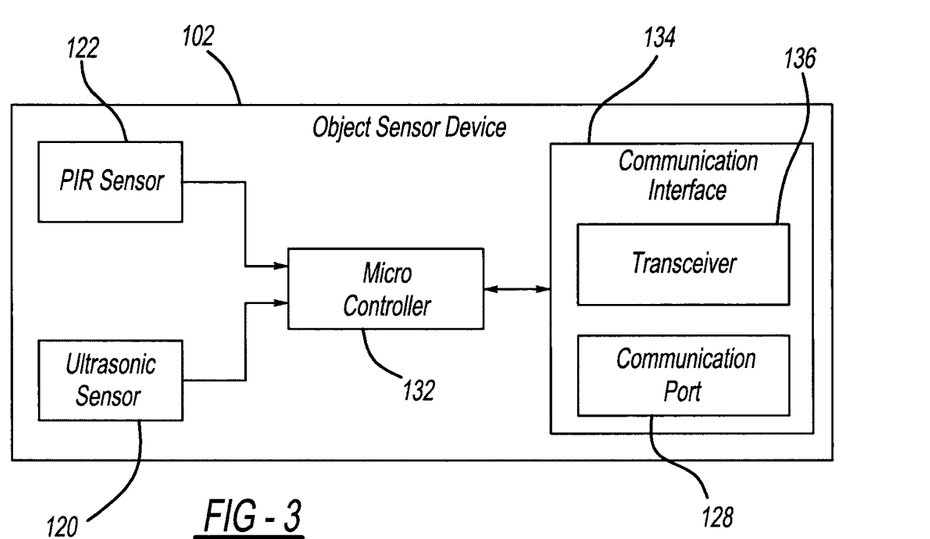
FIG. 3 is a block diagram of the object sensor device.

FIGS. 2 and 3 illustrate an example implementation of the object sensor device 102. The object sensor device 102 includes an ultrasonic sensor 120 and a passive infrared (PIR) sensor 122. The ultrasonic sensor 120 senses a distance to the target object based on a reflected signal. Specifically, the ultrasonic sensor 120 may transmit high-frequency sound waves and receive a signal reflected by the target object. The time interval between transmitting the signal to receiving the reflected signal is used to determine the distance between the ultrasonic sensor 120 attached to the observer and the target object. In an example embodiment, the ultrasonic sensor 120 detects objects within a predefined detection range (e.g., 30 cm to 5 m) and calculates the distance using the first ultrasonic reflection, thereby reducing signal processing complexity and subsequently enhancing energy efficiency.

The PIR sensor 122 detects an infrared radiation emitted or reflected from the target object, and outputs a voltage value indicative of the infrared radiation. For instance, the PIR sensor 122 may detect a change in the amount of infrared radiation detected. In an example embodiment, the PIR sensor 122 records temperatures within a range of 0 to 50° C. While specific operation ranges are given for the ultrasonic sensor 120 (e.g., 30 cm to 5 m) and the PIR sensor 122 (e.g., 0 to 50° C.), it should be readily understood that the ultrasonic sensor 120 and the PIR sensor 122 may be selected to detect within other operation ranges and should not be limited to the examples provided herein.

The object sensor device 102 may also include a housing 124, a power supply 126, a communication port 128, and a charge port 130. The housing 124 houses the components of the object sensor device 102, such as the ultrasonic sensor 120, the PIR sensor 122, and the power supply 126.

The power supply 126 supplies electric power to the components of the object sensor device 102 and may be, for example, a rechargeable battery. In an example embodiment, the components of the object sensor device 102 may be selected to minimize power consumption, so that the object sensor device 102 may operate for several days (2-3 days) on a single charge. Alternatively, the power supply 126 may be a component that couples to a power source, such as a power grid or an external battery, so that the object sensor device 102 may continuously receive power.

The communication port 128 and the charge port 130 are provided along an outer portion of the housing 124. The communication port 128 is configured to communicably couple the object sensor device 102 to, for example, the computing device 104 via a cable. The charge port 130 is configured to supply power to the power supply 126 from a power source (e.g., power grid accessible via a power outlet) via a cable. While the communication port 128 and the charge port 130 are provided as two separate ports, the object sensor device 102 may include one port for both charging the power supply 126 and communicating with the computing device 104.

With reference to FIG. 3, the object sensor device 102 may also include a microcontroller 132 and a communication interface 134. The microcontroller 132 may include a processor and is communicably coupled to the PIR sensor 122 and the ultrasonic sensor 120. In an example embodiment, the ultrasonic sensor 120 and the PIR sensor 122 may output an analog signal to the microcontroller 132, and the microcontroller 132 may then convert the analog signal to digital data indicative of the distance and the temperature sensed by the ultrasonic sensor 120 and the PIR sensor 122, respectively. The microcontroller 132 may convert the analog signal at a predefined sampling rate (e.g., 10 Hz). The distance and temperature data may be collectively referred to as sensor information.

From the microcontroller 132, the communication interface 134 may transmit the information to the computing device 104 by way of wireless or wired communication.

Accordingly, the communication interface 134 may include a transceiver 136 for wireless communication and the communication port 128 for wired communication. For wireless communication, the communication port 128 may establish a communication link with the computing device 104 using, for example, Bluetooth, ZigBee, and/or other suitable wireless communication protocols.

The object sensor device 102 can be configured in various suitable shapes and sizes for sensing the distance and temperature of the target object for a particular application. For example, if the observer is a human, the object sensor device 102 may have a compact design for easily attaching to the human. Alternatively, if the observer is an inanimate object, such as a vehicle, the object sensor device 102 may have additional components for interfacing with a control module in a vehicle and, therefore, may be larger in size.

Figure 4:
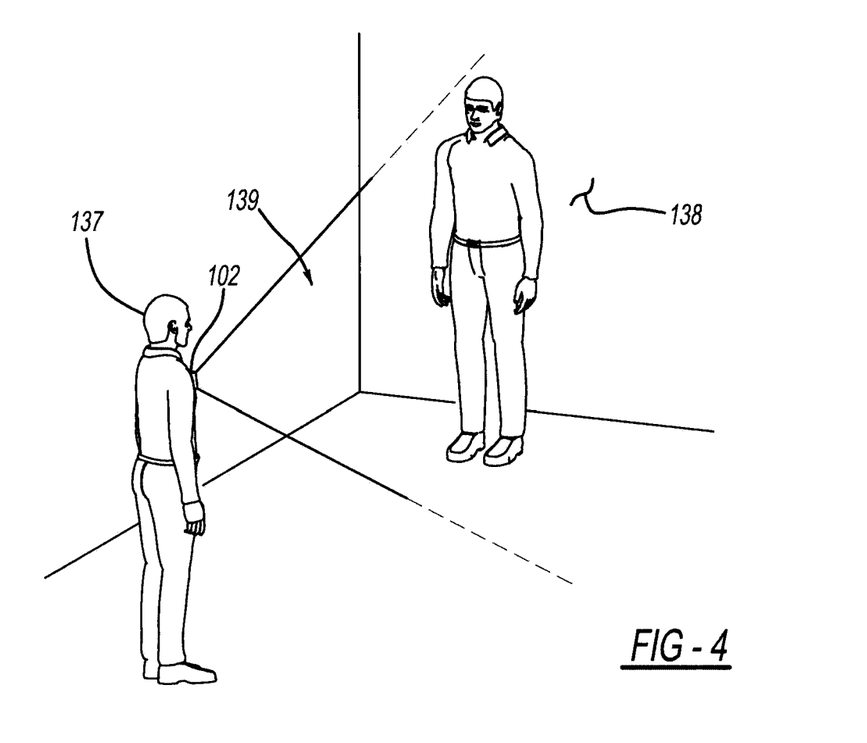
FIG. 4 illustrates an observer with the object sensor device.

The object sensor device 102 monitors a detection region extending from a side of the object sensor device 102 having the ultrasonic sensor 120 and the PIR sensor 122. For example, with reference to FIG. 4, the object sensor device 102 is attached to an observer 137 to detect one or more target objects 138 (e.g., human and/or wall) within a region 139. In FIG. 4, the observer 137 is provided with one object sensor device 102. Alternatively, more than one object sensor device 102 may be attached to the observer 137 to monitor multiple detection regions at the same time. For example, a first object sensor device may be positioned along a first surface of the observer (e.g., chest area of a human) and a second object sensor device may be positioned along a second surface of the observer opposite to the first surface (e.g., back of the human). Accordingly, the living object detection system 100 may determine if a living object is present in more than one detection region.

Figure 5:
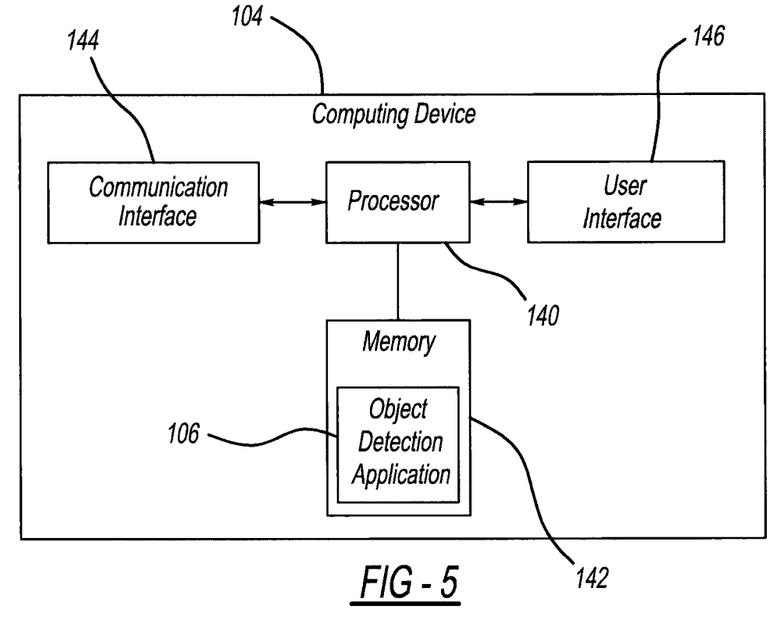
FIG. 5 is a block diagram of a computing device including an object detection application.

The computing device 104 having the object detection application 106 stored therein may also be referred to as the object detection device or an object detection module. The computing device 104 may be, for example, a laptop, a smart phone, and/or a computer tablet. FIG. 5 illustrates an example block diagram of the computing device 104 that includes, for example: a processor 140, memory 142, a communication interface 144, and a user interface 146. The memory 142 may store the object detection application 106 and other programs/applications that are executable by the processor 140.

The communication interface 144 establishes wireless and/or wired communication links between the computing device 104 and external devices, such as the object sensor device 102 and the object classification database 108. For example, the communication interface 144 may include a transceiver for wireless communication and/or a cable port for wired communication. The communication interface 144 may be configured to establish wireless communication links by way of Bluetooth, WiFi, ZigBee, cellular networks (e.g., 3G networks), and/or other suitable wireless networks.

The user interface 146 includes components for communicating with a user of the computing device 104. For example, the user interface 146 may include: a display device, such as a liquid crystal display; speakers; microphone; and a touch screen and/or one or more buttons operable by the user. The computing device 104 may include other components not illustrated in FIG. 5 and should not be limited to the components described herein.

The object detection application 106 determines whether a living object is in proximity of the observer based on the sensor information from the object sensor device 102. More particularly, in an example embodiment, the object detection application 106 calculates predetermined physical features of the target object using the sensor information and compares the physical features to predefined object classifiers. Using the display device of the computing device 104, the object detection application 106 may display information regarding the target object, such as whether the target object is a living object, to the user.

Figure 6:
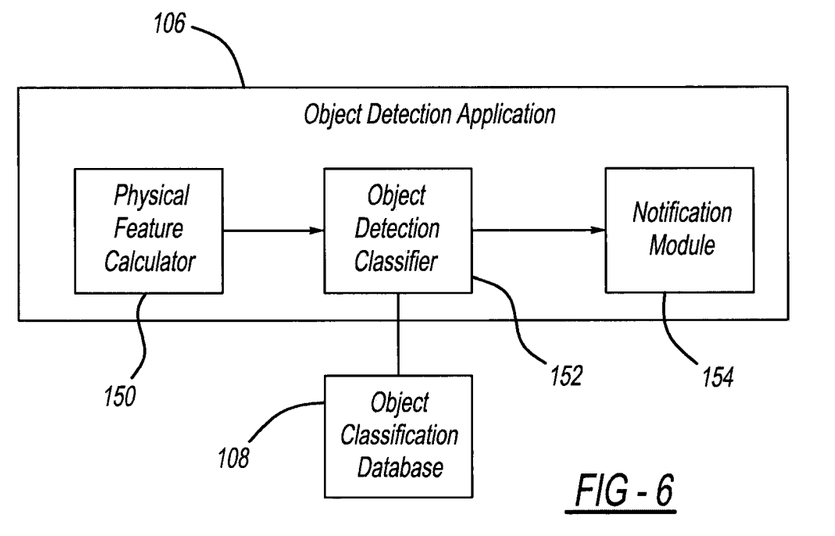
FIG. 6 is a block diagram of the object detection application.

With reference to FIG. 6, the object detection application 106 may include a physical feature calculator 150, an object detection classifier 152, and a notification module 154. By way of the communication interface 144 of the computing device 104, the object detection application 106 receives the sensor information from the object sensor device 102.

The physical feature calculator 150 calculates the physical features of the target object based on predefined algorithms and the sensor information. In the example embodiment, the physical features used for classifying the target object include a temperature parameter, a distance parameter, and a coefficient of variation (CoV) of the distance. The temperature parameter may be the average temperature detected of the target object for a predetermined time period. For example, the temperature parameter may be the average temperature during a one-second time period. Similarly, the distance parameter may be the average distance detected of the target object during the predetermined time period.

Based on the physical features calculated, the object detection classifier 152 determines whether the target object is a living object, such as a human, or an inanimate object (i.e., non-living object), such as a wall. More particularly, the object detection classifier 152 uses predetermined object classifiers stored in the object classification database 108 to classify the target object. The object classification database 108 may be, for example, a cloud-based database accessible by the object detection application 106 by way of a wireless communication link, such as WiFi or a cellular network. The object classification database 108 may also be referred to as an object classification data unit.

The object classifiers stored in the object classification database 108 may be based on experimental data in which sensor information was gathered according to controlled experiments in which an observer interacts with one or more living objects at predefined distances and angles. For example, in one experiment, a human observer having the object sensor device 102 attached thereon was positioned near a human object and a wall. The distance and angle of the human observer with respect to the human object and the wall was set at predetermined values. Sensor information was collected for a ten-second time interval at each of the predefined distances and angles.

Figure 7:
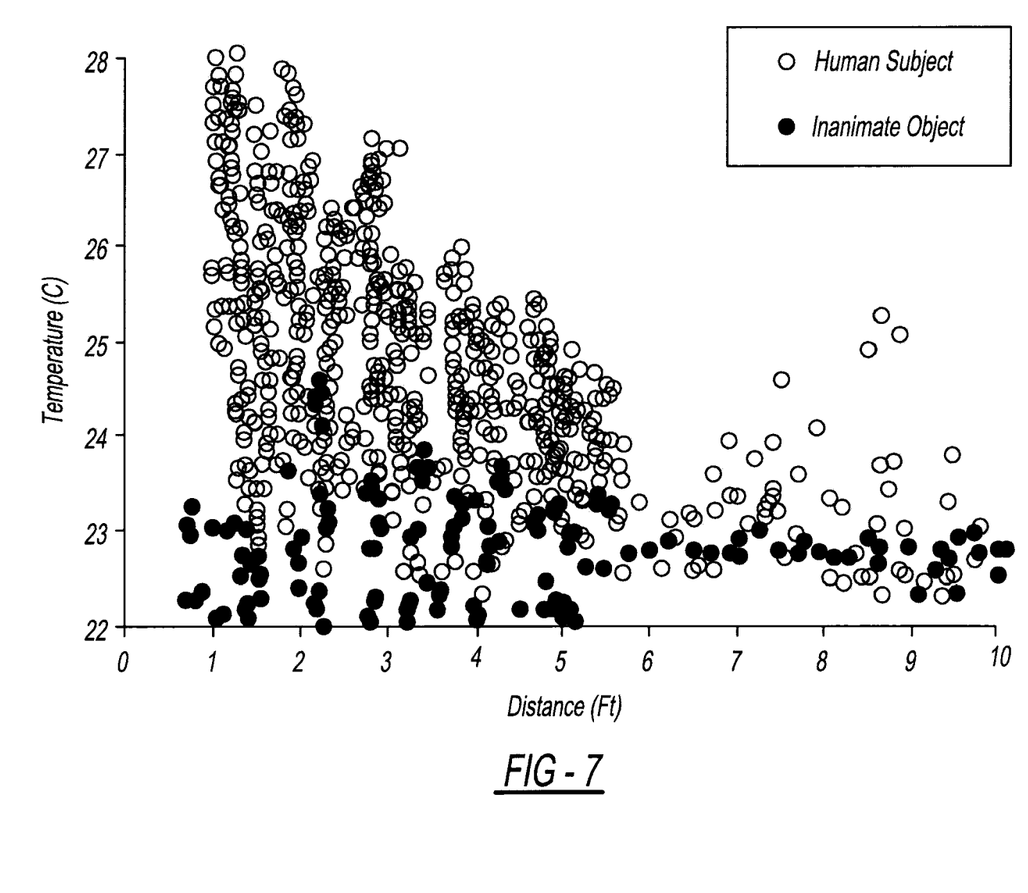
FIG. 7 is a chart illustrating data clusters distinguishing between a human subject and an inanimate object based on distance and temperature as physical features.

Initially, the physical features were provided as the temperature parameter and the distance parameter. FIG. 7 illustrates a chart that illustrates data clusters for a human subject and an inanimate object using physical features calculated over a one-second window. As illustrated, by using distance and temperature as physical features, the target object can be accurately recognized as human or an inanimate object.

However, overlap may exist for a considerable number of measurements, such as around 23° C., which may make it difficult to distinguish between living and non-living objects. While the field of view of each sensor device should support illumination of the target at such orientations, variability in the positioning of either the sensor device or the observer may create scenarios in which this is not the case. Additionally, such misalignments also account for observed distance measurements exceeding those which should be expected in an ideal scenario.

Figure 8:
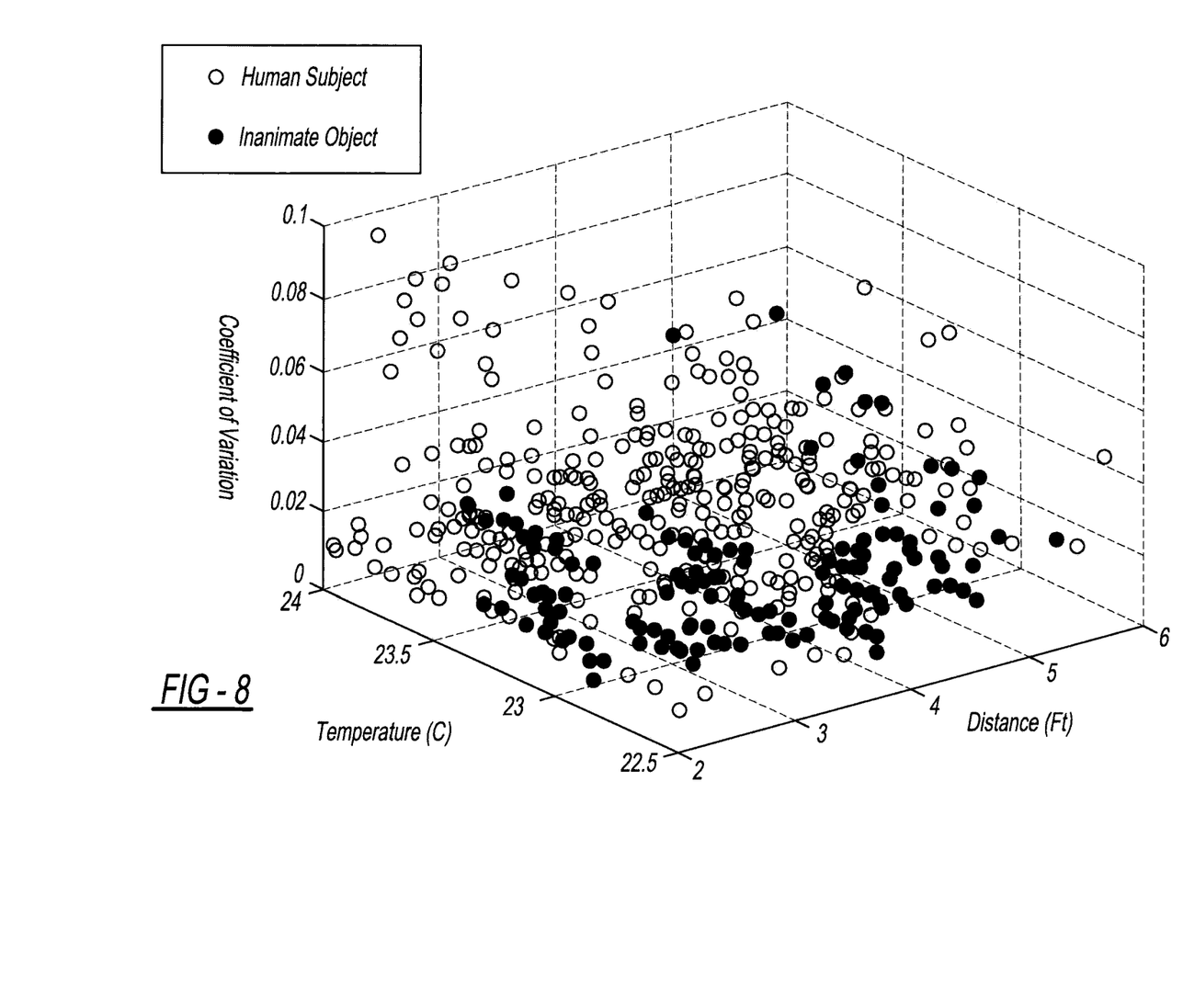
FIG. 8 is a chart illustrating data clusters distinguishing between a human subject and an inanimate object based on distance, temperature, and coefficient of variation of distance as physical features.

Accordingly, to increase the accuracy of the classification, the physical features may further include the CoV of the distance to further distinguish human interaction. Specifically, the CoV of distance captures dispersions associated with slight movements during interaction of the observer and the target object irrespective of separation distance, and is used to further distinguish measurements associated with living objects from background signals caused by inanimate objects. FIG. 8 illustrates a chart of physical features which includes average distance, average temperature, and the CoV of distance. The chart of FIG. 8 is isolated within the region of distance measurements which is expected based upon interaction geometry. For those samples with larger distance measurements corresponding to time intervals where the field of view of the object sensor device becomes misaligned, the distinguishing power of the CoV is diminished. This is associated with the fact that these misalignment periods are often isolated in time amongst adjacent intervals of appropriate alignment. This subsequently enhances variability in the resulting time series independent of human presence.

Figure 9:
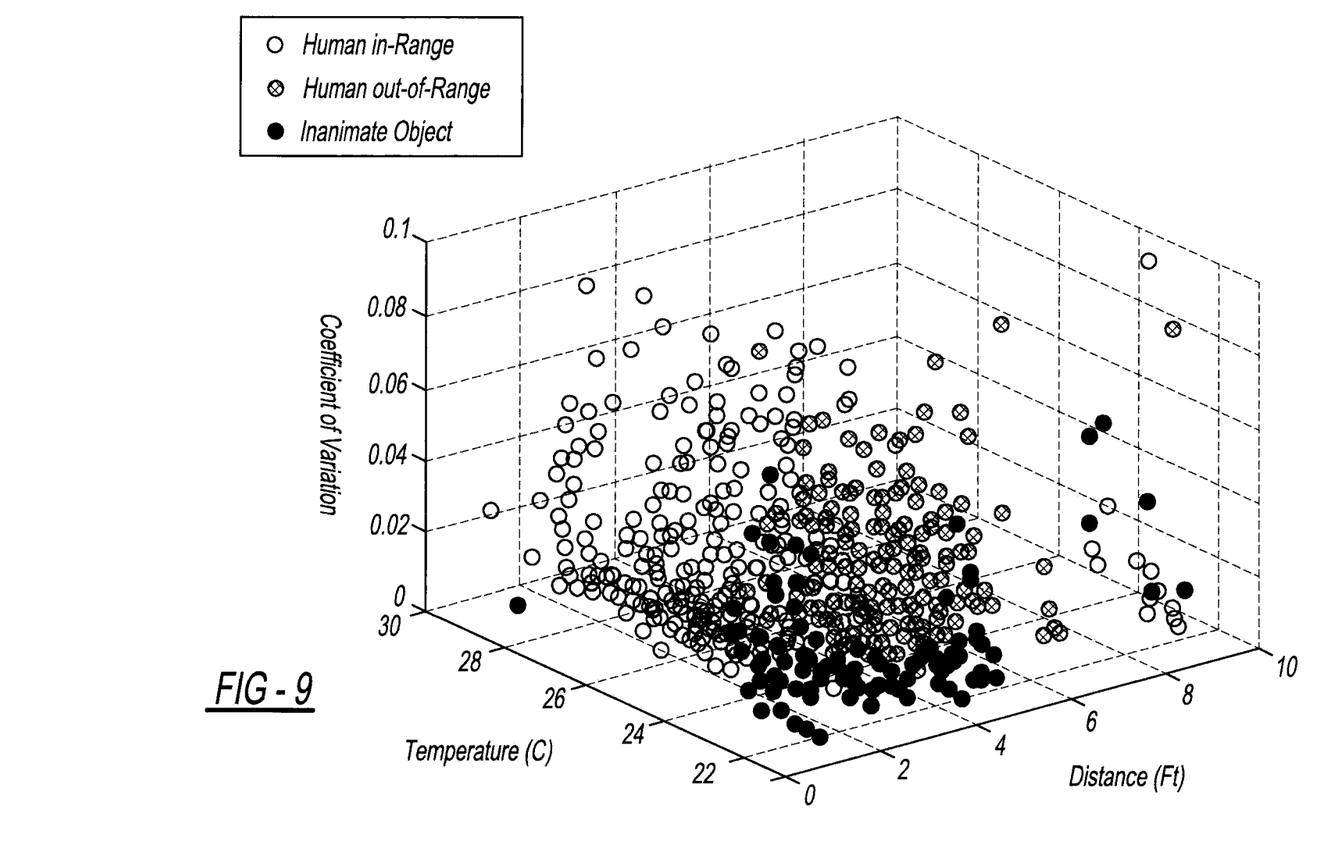
FIG. 9 is a chart illustrating data clusters distinguishing between a human subject within a specified range, a human subject outside the specified range, and an inanimate object based on distance, temperature, and coefficient of variation of distance as physical features.

Through additional experimentation and calculation, the physical features may be further classified to distinguish between a living object within a predefined region and a living object outside of the predefined region. For example, data for each experimental configuration was segmented into non-overlapping windows of one-second duration resulting in 3,600 data points which were subsequently partitioned using 10-fold cross validation. For initial analysis, the predefined region was provided as a three-foot distance threshold yielding 1,620 samples of in-range human objects and 1,980 of both out-of-range human objects and background samples (e.g., inanimate object like a wall). FIG. 9 illustrates a chart that distinguishes physical features as belonging to a human within a predefined range, a human outside of the predefined range, and an inanimate object.

Using the experimental data and a learning model, a classification system/model is formed to determine whether the target object is a living object, such as a human, or a non-living object. For example, a k-nearest neighbors (KNN) learning model may be used to generate object classifiers in which the physical feature set includes average distance, average temperature, and CoV of distance. The object classifiers based on the KNN model may provide predetermined physical feature values for classifying a given object as a living object and for classifying a given object a non-living object. The object classifiers are stored in the object classification database 108. While the example embodiment utilizes the KNN learning model, other suitable machine learning models may be used for generating the object classifiers.

In the example embodiment, based on the object classifiers and the calculated physical feature, the object detection classifier 152 may determine whether the target object is a living object or a non-living object. For example, if the calculated physical features coincide with the predetermined physical feature values for a living object, the object detection classifier 152 may classify the target object as a living object. On the other hand, if the calculated physical features coincide with the predetermined physical feature values for a non-living object, the object detection classifier 152 may classify the target object as a non-living object.

Through the user interface 146 of the computing device 104, the notification module 154 of the object detection application 106 may notify the user of the detection system 100 of the target object. For example, the notification module 154 may display a report in the form of a graphical user interface that indicates whether a target object near the observer is a living object, such as a human. The notification module 154 may also display graphs that illustrate the average distance to one or more target objects and/or the temperature of the one or more target objects. The notification module 154 may also display a time chart that indicates how long the observer has been interacting with the target object. The notification module 154 may be configured to provide other reports and should not be limited to the examples provided herein. In addition to displaying information, the notification module 154 may also send a message to a user of the system via the communication interface 144 of the computing device 104. For example, the notification module 154 may transmit an electronic message to a user of the living object detection system 100.

In operation, the living object detection system 100 may include one or more of the object sensor devices that are attached to the observer, such as a human. The object sensor device detects the distance to and the temperature of target object within a detection region of the object sensor device. The object detection module, which may include the computing device and the object detection application, determines whether the target object is a living object, such as a human, or an inanimate object, such as a wall. Specifically, the object detection module uses predefined classifiers stored in the object classification database that combine distance and temperature to distinguish between warm-blooded living objects and inanimate objects.

Once the target object is classified, the object detection module may provide a report to the user notifying the user of the interaction between the observer and the target object. For example, the report may include information regarding the interaction, such as whether the target object is another human, the amount of time the target object and the observer have been interacting, the distance of the observer to the target object, and/or the location of the target object with respect to the user over a period of time. The object detection module may monitor the interaction of the observer in real-time. For example, as the object detection module calculates the physical features, the module may refresh the report with the latest calculations and detection results.

In the example embodiment, the object detection module, which includes the computing device and the object detection application, classifies the target object using the object classifiers in the object classification database. Alternatively, the object detection module may transmit the sensor information to the object classification database and the object classification database may then calculate the physical features of the target object and classify the target object based on the calculated physical features and the object classifiers. The object classification database may then output a classification result to the object detection module. Accordingly, the physical feature calculator and the object detection classifier may be part of the object classification database.

In another embodiment, the object detection module may output the calculated physical features to the object classification database. The object classification database may then classify the target object based on the received physical features and the object classifiers, and output a classification result to the object detection module. Accordingly, the object detection classifier may be part of the object classification database.

In the example embodiment, the physical features of the target object include a distance parameter, a temperature parameter, and a CoV of distance. Alternatively, the physical features may include the distance parameter and the temperature parameter.

The living object detection system 100 of the present disclosure may be implemented in various applications. As an example, the living object detection system 100 may be used as part of a human social interaction application for monitoring human interaction in the healthcare field (i.e., monitoring interaction between elderly people, patients suffering from depression, Alzheimer's, and/or post-traumatic stress disorder), in the retail field (i.e., tracking how sales personnel see/interact with customers), and in the education and research fields (i.e., tracking children in classrooms for early assessment of autism and other developmental risks).

In addition to monitoring the interaction between humans, the living object detection system 100 may also be used to monitor the interaction of the observer with other warm-blooded creatures, such as dogs, cats, deer, and/or other animals. Furthermore, the observer does not have to be a living object. For example, the observer may be an inanimate object, such as a vehicle, a display case, and/or other non-living objects. In such applications, the living object detection system 100 may be used to determine whether a warm-blooded living object, such as a human, is in the proximity of the inanimate object as well as to determine how long the living object has been there.

Figure 10:
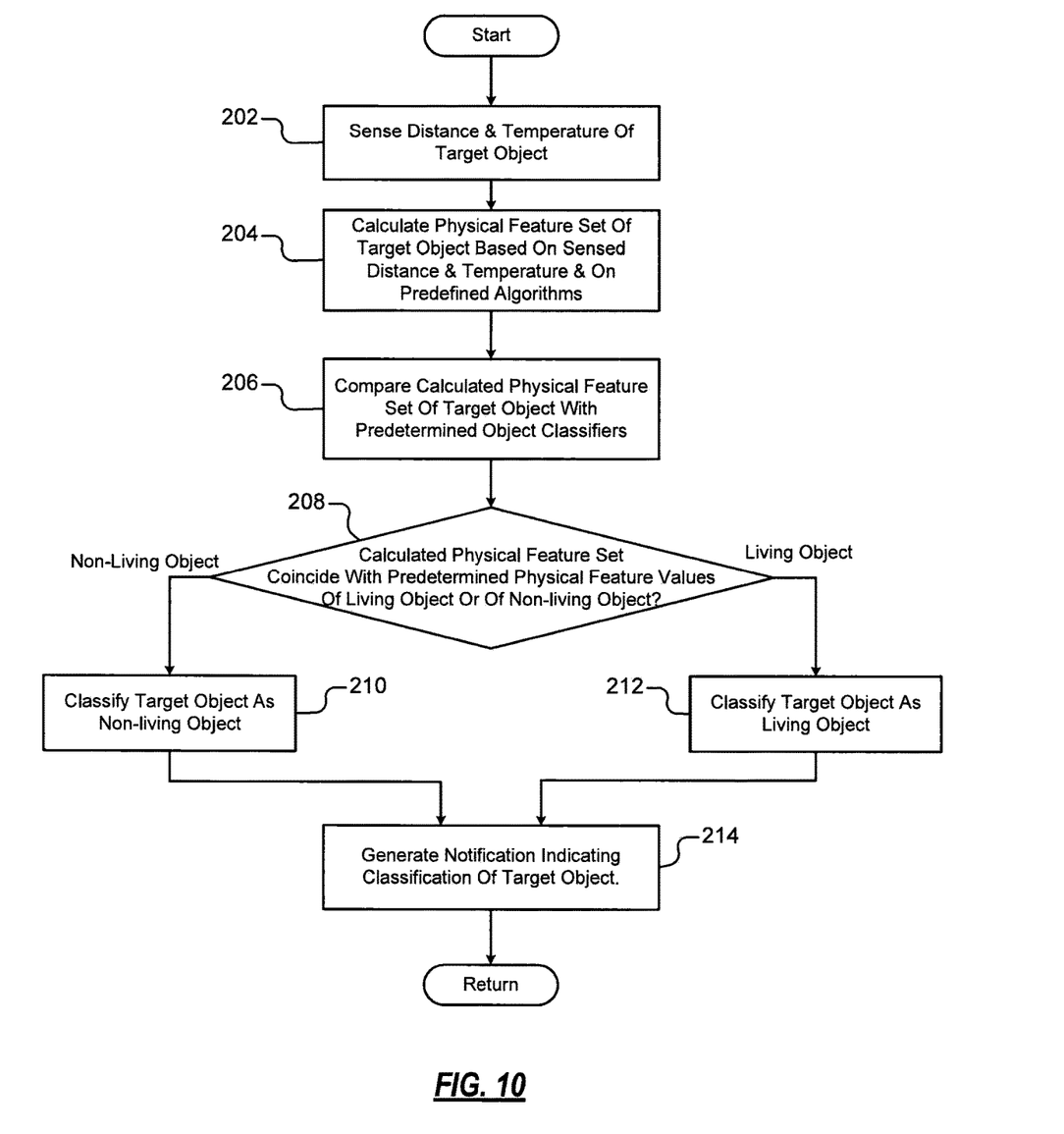
FIG. 10 is an example of an object interaction routine that may be performed by the living object detection system.

With reference to FIG. 10, an example implementation of an object interaction routine is provided. The routine of FIG. 10 can be performed by the living object detection system of the present disclosure. In an example implementation, the object sensor device is attached to the observer for detecting a living object, such as a human, that may interact with the observer. At 202, the routine senses distance and temperature of one or more target objects located within a detection region of the object sensor device by way of the ultrasonic sensor and the PIR sensor of the object sensor device. At 204, the routine calculates a physical feature set of the target object based on the sensed distance and temperature and on predefined algorithms. For example, the physical feature set may include an average distance and an average temperature of the target object. The physical feature set may also include a coefficient of variation of distance.

The system then classifies the target object as either a living object or a non-living object. For example, at 206, the routine may compare the calculated physical feature set with predetermined object classifiers. The predetermined object classifiers may include, for example, predetermined physical feature values for classifying a given object as a living object and for classifying the given object as a non-living object. At 208, if the calculated physical feature set corresponds with the predetermined physical feature values of a non-living object, then the routine classifies the target object as a non-living object at 210. If the calculated physical feature set corresponds with the predetermined physical feature values of a living object, then the routine classifies the target object as a living object at 212.

The routine may then generate a notification indicating the classification of the target object at 214. As an example, the system may display a graphical user interface that indicates the location of the living object with respect to the observer. Based on the application of the living object detection system, the system may also be configured to further evaluate the relationship between the observer and the target object to assess. For example, the system may determine: how long the observer has been interacting with the target object, the number of living objects the observer has interacted with in a given time period, or other suitable characteristics.

The living object detection system of the present disclosure is a wearable platform capable of sensing the presence of, for example, a human within a specified geometry independent of audio or video capture. The living object detection system is asymmetric in nature, meaning that it does not demand that the observer and the target object be in possession of dedicated hardware platforms. In the present disclosure, sensing is accomplished using classification algorithms which leverage the fusion of information extracted from distance and temperature data gathered from a passive infrared (PIR) and ultrasonic sensor. The PIR sensor empowers the distinction of human reflections gathered by the ultrasonic sensor from those associated with inanimate objects on the basis of elevated thermal emissions. Additionally, the respective directivities of the individual sensors, coupled with the distance inferred from ultrasonic echolocation, allows for estimation of the relative geometry of the observer with respect to the target object.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as a remote, or cloud) module may accomplish some functionality on behalf of a client module.

What is claimed is:

1. A living object detection system for detecting interaction between an observer and a target object, the system comprising:
   an object sensor device attachable to the observer and including an ultrasonic sensor for sensing distance to the target object and a passive infrared sensor for sensing temperature of the target object, wherein the object sensor device outputs sensor information that includes data indicative of the distance sensed by the ultrasonic sensor and of the temperature sensed by the passive infrared sensor;

an object classification data unit storing predetermined object classifiers that identifies an object as a living object or non-living object; and an object detection module communicably coupled to the object sensor device and receives the sensor information from the object sensor device, wherein the object detection module determines a coefficient of variation of the distance to the target object and classifies the target object as a living object or a non-living object based on the object classifiers stored in the object classification data unit and on a physical feature set of the target object, the physical feature set is derived from the sensor information and includes the distance to the target object, the coefficient of variation of the distance to the target object, and the temperature of the target object.

2. The living object detection system of claim 1 wherein the object classification data unit is external of the object detection module and is communicably coupled to the object detection module via wireless communication.

3. The living object detection system of claim 1 wherein the object detection module calculates the physical feature set of the target object based on the sensor information from the object sensor device and predefined algorithms, and classifies the target object as the living object or non-living object based on the physical feature set calculated and the object classifiers stored in the object classification data unit.

4. The living object detection system of claim 1 wherein:
the object detection module transmits the sensor information to the object classification data unit, and
the object classification data unit calculates the physical feature set of the target object based on the sensor information, classifies the target object based on the physical feature set calculated and the object classifiers, and outputs a classification result to the object detection module.

5. The living object detection system of claim 1 wherein the object detection module includes a computing device and an object detection application stored in and executable by the computing device.

6. The living object detection system of claim 1 wherein the distance parameter is an average distance sensed by the ultrasonic sensor for a preset time period and the temperature parameter is an average temperature sensed by the passive infrared sensor for the preset time period.

7. The living object detection system of claim 1 wherein the object classifiers are based on k-nearest neighbor classification learning model.

8. The living object detection system of claim 1 wherein the object classifiers stores a first set of predetermined physical feature values for classifying a given object as a living object and a second set of predetermined physical feature values for classifying the given object as a non-living object.

9. The living object detection system of claim 8 wherein the object detection module determines that the target object is the living object when the physical feature set of the target object coincide with the first set of predetermined physical feature values and determines that the target object is a non-living object when the physical feature set of the target object coincide with the second set of predetermined physical feature values.

10. The living object detection system of claim 1 further comprising a plurality of the object sensor devices.

11. The living object detection system of claim 1 wherein the object sensor device determines the distance based on a first reflected signal received by the ultrasonic sensor.

12. A method for detecting interaction between an observer and a target object, the method comprising:
sensing, by an object sensor device, a distance to the target object and a temperature of the target object, wherein the object sensor device is attachable to the observer and includes an ultrasonic sensor for sensing the distance and a passive infrared sensor for sensing the temperature;
calculating a coefficient of variation of the distance to the target object;
calculating a physical feature set of the target object based on the distance and the temperature sensed by the object sensor device and on predefined algorithms, wherein the physical feature set includes the distance to the target object, the coefficient of variation of the distance and the temperature of the target object;
classifying the target object as a living object or a non-living object based on the physical feature set and predetermined object classifiers, wherein the predetermined object classifiers associates predetermined physical feature values for classifying a given object as a living object and for classifying a given object as a non-living object; and
outputting a notification indicating whether the target object is a living object or a non-living object based on the classification.

13. The method of claim 12 wherein the classifying the target object further comprises:
comparing the calculated physical feature set of the target object with the predetermined object classifiers;
determining the target object is the living object when the calculated physical feature set of the target object coincide with the predetermined physical feature values associated with the living object; and
determining that the target object is the non-living object when the calculated physical feature set of the target object coincide with the predetermined physical feature values associated with the non-living object.

14. The method of claim 12 wherein the object classifiers are based on k-nearest neighbor classification learning model.

15. The method of claim 12 wherein the object classifiers are stored in a database remote from the object sensor device.

16. The method of claim 12 further comprising:
storing, by an object detection module, the classification of the target object; and
generating, by the object detection module, a report indicating the classification of the target object.

17. The method of claim 12 wherein the distance parameter is an average distance sensed by the ultrasonic sensor for a preset time period and the temperature parameter is an average temperature sensed by the passive infrared sensor for the preset time period.

18. The method of claim 12 wherein the calculating of the physical feature set is performed by an object detection module that is separate from the object sensor device.

* * * * *